Nov. 2, 1965  M. LEVECQUE ETAL  3,215,514
METHOD OF AND APPARATUS FOR PRODUCING FIBERS FROM
THERMOPLASTIC MATERIAL
Filed May 15, 1962  3 Sheets-Sheet 1
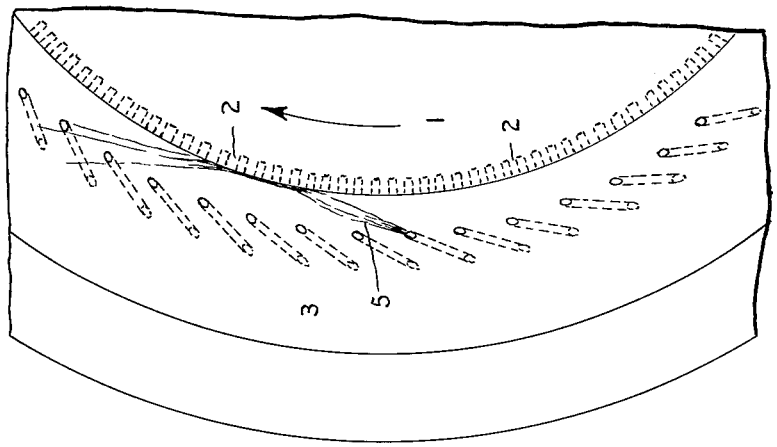
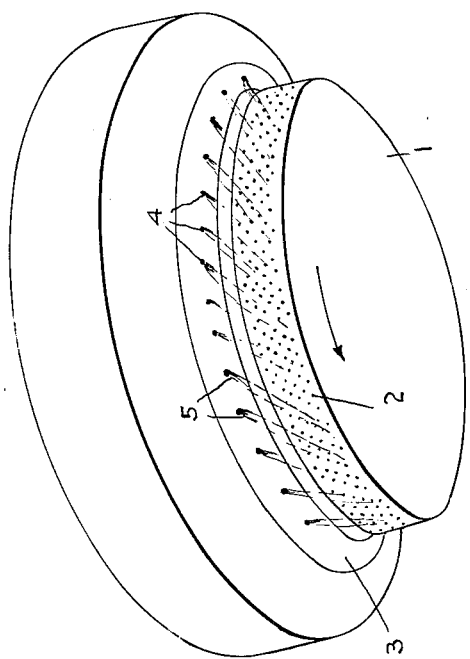
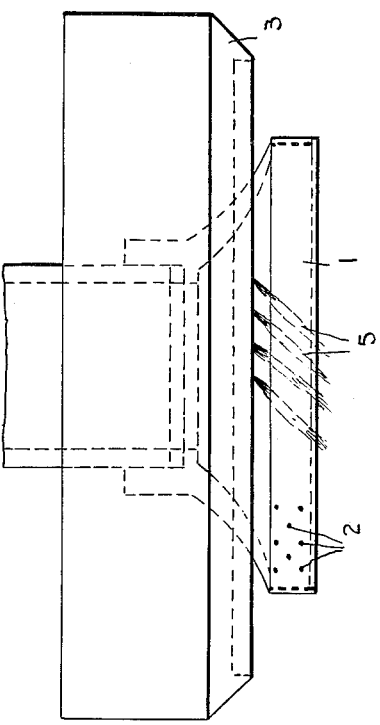
INVENTORS
MARCEL LEVECQUE
& MAURICE CHARPENTIER
BY Albert L. Kray
ATTORNEY

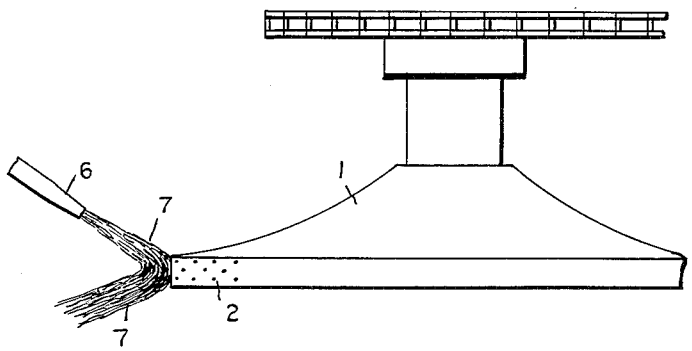
Fig. 4.
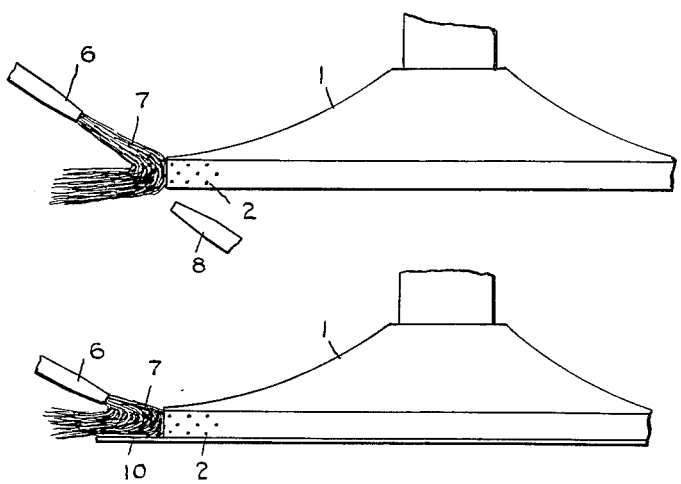
Fig. 5.
Fig. 6.
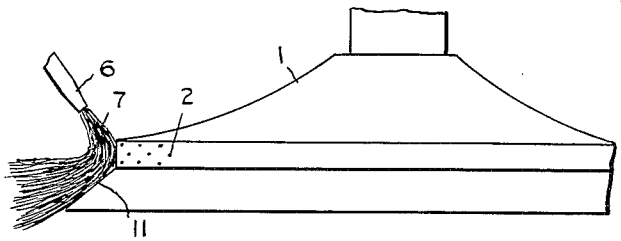
Fig. 7.
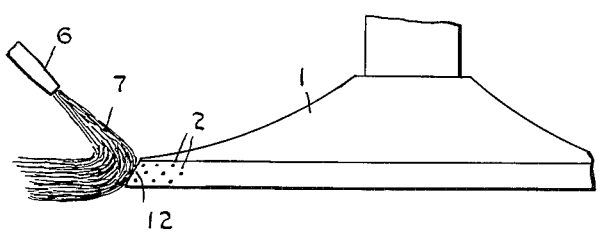
Fig. 8.
INVENTORS
MARCEL LEVECQUE
& MAURICE CARPENTIER Nov. 2, 1965 M. LEVECQUE ETAL 3,215,514
METHOD OF AND APPARATUS FOR PRODUCING FIBERS FROM
THERMOPLASTIC MATERIAL
Filed May 15, 1962 3 Sheets-Sheet 3

INVENTORS
MARCEL LEVECQUE
& MAURICE CARPENTIER
BY Albert L. Frey
ATTORNEY

United States Patent Office 3,215,514
Patented Nov. 2, 1965

---

3,215,514
METHOD OF AND APPARATUS FOR PRODUCING FIBERS FROM THERMOPLASTIC MATERIAL
Marcel Levecque, Saint-Gratien, and Maurice Charpentier, Rantigny, France, assignors to Compagnie de Saint-Gobain, Paris, France, a corporation of France
Filed May 15, 1962, Ser. No. 194,862
Claims priority, application France, Feb. 28, 1955, 686,479, Patent 1,124,487; July 15, 1955, 55,713
12 Claims. (Cl. 65—6)

This application is a continuation-in-part of our application Serial No. 567,030, filed February 21, 1956, now abandoned.

The present invention relates to the manufacture of fibers from mineral materials, in the viscid state, and particularly glass fibers.

More particularly, it deals with the method of making such fibers in which the centrifugal force is utilized to conduct the viscous material inside a hollow body to and through orifices in the periphery of the body, the latter being rotated around its axis at high speed. The material is projected by this force from the orifices in the form of jets or filaments and these are then subjected to entrainment and drawing which transforms them into fine fibers.

An object of the invention is the provision of a procedure by which there is projected toward the zone bordering the outer surface of the peripheral wall of the centrifugal body, and particularly in contact with the projection orifices for the viscous material, a fluid at high temperature, for example flames, affecting the entire height of the peripheral wall of the centrifugal body, and acting on the viscous material just at its exit from the orifices.

The invention provides for the use of centrifugal bodies presenting a sizable peripheral frontal surface with a large number of orifices divided in a plurality of superposed rows. It has been found that the turbulent currents which otherwise occurred along the peripheral frontal area of a centrifugal body could be avoided or at least reduced to a great extent.

Applicants have found as another characteristic of the invention, that particularly beneficial results are obtained with flames whose highest temperature is close to the periphery of the centrifugal body.

According to one form of the invention, the flames which are projected toward the zone bordering on the peripheral wall of the centrifugal body and in actual contact with the projection orifices throughout the height of the wall, are directed tangentially or substantially tangentially to this wall.

According to another form of the invention, the gaseous fluid at high temperature is given a direction such that it carries a component in a plane perpendicular to the axis of rotation of the centrifugal body, and is directed especially in the direction of rotation of the centrifugal body. The burners producing these jets of gaseous fluid or flames are then placed so that the direction of these jets or flames is tangential or substantially tangential to the peripheral wall of the centrifugal body and inclined to the axis of rotation.

The invention of the form just described presents the following advantages. It avoids, in the first place, the cutting or rupture of the fibers which may be induced by the effect of shock produced by contact of the flames with the periphery of the centrifugal body. In fact the tangential direction, or the tangential component of the flame, permits a suppression of this shock effect. Moreover, this direction given to the flame, facilitates the formation of long fibers, the flame naturally entraining and carrying the fibers during formation and over a great length and especially in the region next to the projection orifices where the temperature is high. Applicants have found also that particularly advantageous results are obtained when the flames, projected in the direction of rotation of the centrifugal body, reach the peripheral wall of the centrifugal body at a speed of the order of the peripheral speed of said wall.

According to another form of the invention, the flames, which act on the viscous material as soon as it leaves the projection orifices, is then led to accompany the filaments of viscous material in their propagation, so that these filaments remain inside the said flames during their drawing out. Applicants have found that the above conditions favor the drawing process and result in very fine fibers of uniform diameter even with a centrifugal body presenting a sizable peripheral frontal surface with a large number of orifices.

The heating of the material in the high temperature zone, outside of the centrifugal body, obtained by the projection of the flames arranged about the centrifugal body, enables the feed temperature of the material in the centrifugal body to be lower, hence a better preservation of this body and particularly of its filament projection orifices.

Applicants have found that particularly beneficial results are obtainable by using burners fed by combustible gas and fuel which gives a very active flame and which can be regulated in such a way that the hot point near the blue section of the flame is right next to the orifices of the centrifugal body. The activity of the flame and its temperature can be increased by superoxidizing the air admitted in the mixer of the burner.

The invention permits the obtention of fibers having different physical characteristics than those obtainable by the use of attenuating combustion gases of high velocity. The attenuation of the glass filaments which are projected from the centrifuge by centrifugal force with flame burners makes possible the obtention of longer fibers of substantially constant diameter which, for the most part, are in excess of six microns. On the other hand, when combustion gases escaping from a combustion chamber are employed, the resultant fibers are short, their diameter varies within a large range, but they are of a characteristically high degree of fineness. Thus, the latter fibers may have diameters lower than six microns and even lower than one micron.

Many economies accrue from the use of flame burners for the attenuation of the fibers. Thus, when flames are employed, a temperature of 1010° to 1050° may be obtained on the peripheral wall, which temperature is substantially the same as that when combustion gases are employed which escape from an overlying combustion chamber. However, in the former case, the consumption of combustible material is five or six times lower than that in the latter case. For example, when flame burners are employed, the consumption of fuel is about twelve cubic meters per hour, while the consumption of combustible material ranges from 60 to 75 cubic meters per hour when the fuel is converted to combustion gases of high velocity.

The difference in characteristics of the fibers obtainable by the use of flames in comparison with those obtained when combustion gases are used, arises from the essential difference in the two processes. When a combustion chamber is used as heretofore, the burnt gases which issue from the outlet expansion slots of said chambers attain a very high speed, which in practice may range between 100 and 300 meters per second, and sometimes even reach much higher speeds and even supersonic speeds. Therefore, the filaments are strongly attenuated as soon as they penetrate within the gases, which filaments do not go through the gaseous currents. On the other hand, when flame burners are employed in accordance with the present invention, the flames are directed towards the periphery of the centrifuge and the speed of the flames when they reach the peripheral wall are much lower than the speeds mentioned above. The velocity of the filaments upon their projection from the orifices in the peripheral wall of the centrifuge are much greater than the speed of the flames which are reflected from the peripheral wall which accompany the fibers during their propogation. Thus, if the speed of the flames which strike the filaments are initially 30 to 40 meters per second, they are lower after reflection and certainly lower than the attenuating speed of the fibers. Under these conditions the attenuation of the fibers is obtained essentially by the action of centrifugal force, which results in the production of extremely long fibers because of the elimination of disruptive effects by the attenuating flames on the fibers.

The invention provides several methods of causing the flames to accompany and entrain the fibers after their projection from the centrifugal body.

According to one arrangement, the flames directed against the periphery of the centrifugal body can be soft. For instance, for a centrifugal body of 20 cm. diameter and rotating at 3000 revolutions per minute the rate of ejection of the comburent and of the fuel or their mixture is less than 10 meters per second. In this case, the flames can be deflected on the periphery of the centrifugal body in such a way that, without any supplementary means, they accompany the fibers during the formation outside of the centrifugal body.

In another arrangement, the flames are acted upon by suitable means to give the said flame the appropriate direction. In one mode of execution, gas current blasts are produced below the rotating body, by means of nozzles arranged in annular form or by rotating paddles below the centrifugal body and which can be integral with the latter. These blast currents cause the flames to deflect, after they have been directed toward the periphery of the rotating body, and give them a new direction which enables them to accompany the fibers during their formation and projection from the centrifugal body.

The deflection of the flames can also be secured by a material obstacle. For instance, the periphery of the centrifugal body may be given a shape constituting this obstacle, for example, a truncated cone-shape; or a plate or other similar suitable obstacle for deflecting the flame may be provided, such as a truncated cone-shaped skirt may be placed below the projection orifices in the centrifugal body.

It is also foreseen to create, at a certain distance from the centrifugal body, gaseous currents directed in such a way as to force the high-temperature gases arising from the flames to propagate in such a manner that they accompany the fibers resulting from the air induction effect set up at the periphery of the centrifugal body. The thus created gas currents themselves have a tendency to produce a low pressure near the projection orifices and make it possible, in combination with the high-temperature gases, to obtain the pressure effect desired near the projection orifices and in the entire portion surrounding the centrifugal body in which the fibers enveloped by the high-temperature gas are propagated.

These gas flows are obtained by blast or blowing elements, mounted in a concentric circle on the centrifugal body and located far enough from its periphery to permit the desired propagation of the hot gases. A large number of small blast orifices discharging the air currents under pressure can be provided. These jets can be regulated in any desired direction. Applicants have found further that good results are obtainable by placing blast elements parallel to the axis of rotation of the centrifugal element. In these conditions the filaments projected from the centrifugal body are accompanied by the flames and high-temperature gas. This results in extremely favorable drawing conditions and hence fibers with great fineness.

In all the cases where means are provided for deflecting the flames and bringing them to accompany the fibers, it may be advantageous to use hard flames, i.e., flames at which the rate of ejection of the comburent and the fuel or their mixture is greater than 30 meters per second for a centrifugal body of 20 cm. diameter and revolving at 3000 revolutions per minute.

Applicants have found further that good results are obtained by homogeneous heating of all projection orifices on the periphery of the centrifugal body. Such heating can be achieved by dividing the burners directing the flames against these orifices along one or more circles around the centrifugal body. If the periphery of the centrifugal body presents a relatively great height, two or more rows of burners may be placed in concentric circles around the centrifugal body so as to create, near to the periphery of this body, two or more rows of hot points or spots which assure the uniform temperature desired near the orifices. In these conditions, the resultant flame tends to follow the wall of the periphery of the centrifugal body with practically no separation. The concentric circles over which the burners are spaced can be established in various ways. In order to assure a vigorous control of the heating, the several rows of burners can be fed independently by varying the composition and pressure of the air-fuel mixture for each row, or by acting on the distribution of the burners of each concentric circle.

The methods and apparatuses according to the invention are illustrated in the drawings in which:

FIG. 1 is a perspective view of the assembly of the centrifugal body and the high-temperature fluid producing device for flames, the centrifuge being inclined for a better understanding of the invention;

FIG. 2 is a fragmentary side elevation of the centrifugal body and the annular burner surrounding the same;

FIG. 3 is a fragmentary bottom plan view of the centrifugal body and the surrounding annular burner;

FIG. 4 is a diagrammatic side view showing a centrifugal body and burners to be equally spaced around the body projecting flames toward and in contact with the peripheral wall of the body for the envelopment of the filaments issuing from the orifices and the deflection of the fluid and entrained fibers away from the centrifugal body for the attenuation and drawing out of the enveloped fibers;

FIG. 5 is a view similar to FIG. 4 showing the deflection of the flames and enveloped fibers under the influence of gaseous blasts;

FIG. 6 is a view similar to FIG. 4 showing the deflection of the flames and enveloped fibers by a horizontal plate beneath the centrifugal body;

FIG. 7 is a view similar to FIG. 4 showing the deflection of the flames and enveloped fibers by a conical surface beneath the centrifugal body;

FIG. 8 shows the peripheral wall of the centrifugal body in frusto-conical form and the resultant deflection of the flames and enveloped fibers;

Figure 10:
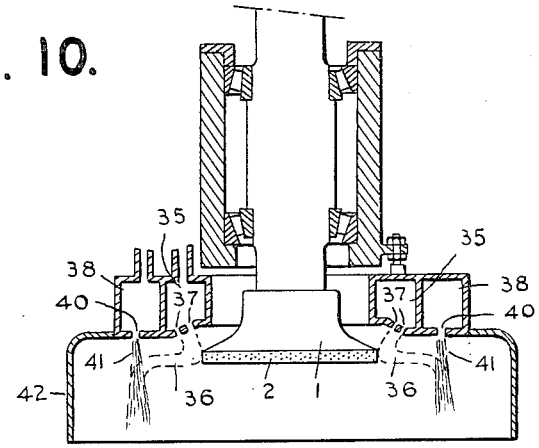
Figure 11:
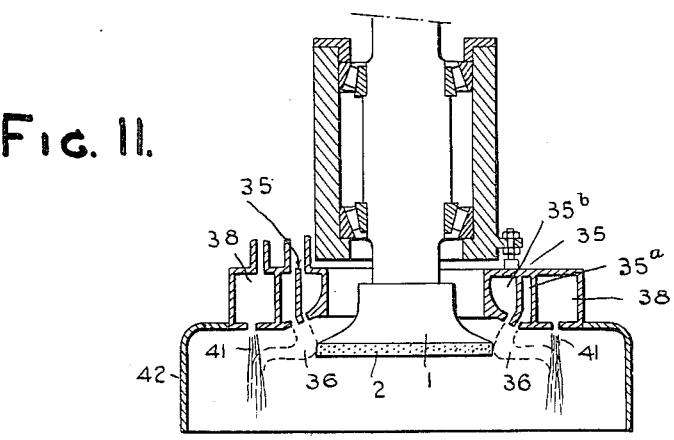

FIG. 10 is a vertical section through an annular burner surrounding the centrifugal body projecting flames against the peripheral wall of the centrifuge and enveloping the filaments issuing therefrom, the deflected flames with the enveloped fibers being surrounded by annular nozzles delivering air blasts for further entrainment and drawing out of the fibers; and FIG. 11 is a view similar to FIG. 10 showing the burner for the flames divided into chambers for attaining a finer control of the flames.

In the several forms represented herein, a centrifugal body 1, rotating at high speed about its axis, say, at 3000 revolutions per minute for example, is equipped on its periphery with a certain number of rows of projection orifices 2, says, from 2 to 20 rows, through which the viscous material, introduced on the inside of the centrifugal body, escapes, and which is projected by centrifugal force through the said orifices. The diameters of the orifices are of the order of some tenths of a millimeter. It is advantageous to place the orifices of the several rows in quincuncial arrangements as shown. Suitable heat conditions will be maintained in the interior of the centrifugal body.

Referring now to FIGS. 1 to 3, about the centrifugal body 1 and concentric to it, is provided a burner 3 in the form of a ring provided at its lower part with a plurality of nozzles 4 through which pass jets 5 of the fluid at high temperature in the form of flames, these nozzles being formed and placed so that the jets or flames issuing therefrom are projected toward the periphery of the centrifugal body, and in contact with the projection orifices 2 along the whole height of the peripheral wall and in a direction presenting a component in a plane perpendicular to the axis of rotation of the centrifugal body and directed in the direction of rotation. As here shown, the burners producing the jets of flames, can be placed so that these jets or flames are directed tangentially or substantially tangentially to the peripheral wall of the centrifugal body and in planes perpendicular to the axis of rotation.

In FIG. 4, the burners 6, spaced annularly about the centrifugal body 1 with soft flames direct their flames 7 toward the projection orifices of the centrifugal body in such a way that the hot points of the flames are in the immediate vicinity of the periphery of the centrifugal body. These flames are deflected at contact with the periphery of the centrifugal body so as to envelop the fibers on their exit from the projection orifices.

In the form represented by FIG. 5, the flames 7 which advantageously may be hard flames, are deflected by gases from blast nozzles or elements 8 located in a circle concentric to the centrifugal body and below the same. These gases act directly on these flames in such a way as to deflect them and cause them to envelop the fibers in their formation, drawing them out and carrying them away.

In the version represented in FIG. 6, the flames 7 meet, after having been in contact with the peripheral part of the centrifugal body with its orifices and enveloping the filaments issuing therefrom, an annular obstacle or deflecting plate 10 which may be attached to the centrifugal body, giving them the desired deflection.

In the modification of FIG. 7, the annular obstacle or deflecting plate is a truncated-one skirt 11 integral with the centrifugal body and serving to deflect the flames and the enveloped fibers in a manner similar to FIG. 6.

In the arrangement represented in FIG. 8, the periphery of the centrifugal body is a truncated cone 12, this shape assuring an appropriate deflection of the flame and envelopment of the filaments projected from the centrifugal body.

Figure 9:
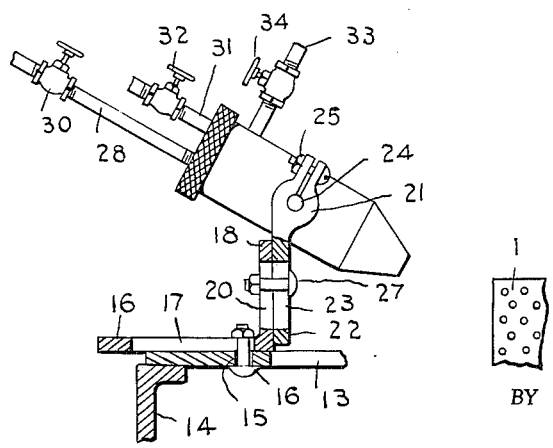
FIG. 9 illustrates a form of adjustable mounting of individual burners spaced uniformly around the centrifugal body.

As herein stated, it is desirable that the burners spaced annularly about the centrifugal body and directing hot gases and flames upon the peripheral wall of the centrifugal body be adjustable in order to fix accurately their position in respect to said wall or the filaments projected therefrom. A form of structure useable for this purpose is shown in FIG. 9.

An annular supporting plate 13 to support a series of spaced burners encircles the centrifugal body 1, supported by legs 14, and is provided with a series of annular spaced slot 15. A description of the mounting of one of the burners will suffice. A right-angle bracket having a horizontal leg 16 is provided with a slot 17 and a vertical leg 18 is provided with a slot 20. A split clamping yoke 21 has a depending leg 22 provided with a slot 23. The burner 6 is provided with opposite trunnions 24 which enter the yoke 21 and are adapted to be clamped therein in a fixed position by the bolts 25. Bolts 26 and 27, located in the slots 15, 17 and 20, 23, respectively, provide for horizontal and vertical adjustments of the burner. The trunnion mounting 24 of the burner provides for a fixing of the inclination thereof. By compounding the adjustments, the burner may be universally oriented including a position to direct its hot gases and flame tangentially or substantially tangentially to the peripheral wall of the centrifugal body.

A fuel line 28 provided with a valve 30 is connected to the burner 6 and an air line 31 provided with a valve 32 is similarly connected. An auxiliary air line 33 having a valve 34 may be connected to the burner for superoxidizing the flame. Adjustment of these valves will serve to regulate and control the character of the hot gases and particularly the flames issuing from the burner.

As previously stated, a plurality of burners equally distributed about the centrifuge and mounted for adjustment can be utilized. These burners can also be mounted in multiple or superposed rows around the centrifugal body. When the burner takes the form of an annular pipe or mixing chamber provided with a plurality of orifices, such conduit or burner can be mounted for adjustment horizontally and vertically in respect to the centrifugal body by employing the supporting plate 13, FIG. 9, with the right angle, slotted brackets shown in that figure conveniently spaced upon and about the annular supporting plate.

In the version represented in FIG. 10, the burners 35 with pre-mixture and superoxidized flame developing a temperature of the order of 1700° C. or more, are placed near the centrifugal body and direct their flames 36 in a ring-like blast through openings 37 toward the projection orifices so that the hot points of the flames are in the immediate vicinity of and in contact with the periphery of the centrifugal body where they envelop and entrain the fibers issuing from the centrifugal body. As shown, the flames or hot gases with the entrained fibers are deflected outwardly from the centrifugal body in a generally horizontal direction, attenuating and drawing out the entrained fibers. The hot gases with the entrained fibers then enter and are enveloped by a ring-like blast of gas or compressed air moving downwardly and issuing from the blast elements 38 provided with openings 40 mounted in a circle around the centrifugal body, enabling the air flow 41 to be directed vertically downward. The distance of these blast elements from the centrifugal body is determined in such a way as to assure a correct entrainment of the gases or flames which accompany and envelop the fibers in their propagation. The blasts 41 from the openings 40 further draw out the fibers. During operation, drops of the material might be projected by the centrifugal body without being transformed into fibers. These drops, which are subjected to a smaller entrainment action by the gaseous currents, strike the casing 42 and drop outside the zone of reception of the fibers, hence will not be commingled with the fibers.

In FIG. 11, the burners 35 have two chambers 35a and 35b which feed the air-fuel mixture at a different rate to control the temperature characteristics and trajectory of the flames to a finer degree.

We claim:

1. The method of manufacturing fine fibers from heated viscous thermoplastic material, which comprises projecting the heated viscous material by centrifugal force from the peripheral wall of a rapidly rotating body having a plurality of superposed rows of orifices therein through which the viscous material issues in filamentary form, and directing flames of lower velocity than that of the centrifugally projected fibers and ranging up to forty meters per second in a tangential direction coincident with the direction of rotary movement of the body and into contact with the external peripheral wall and in enveloping relation with the fibers issuing from the superposed rows of orifices to heat uniformly the fibers as they issue from the orifices and to enhance the attenuation of the fibers in consequence of their envelopment by the flames.

2. The method of manufacturing fine fibers from heated viscous thermoplastic material, which comprises projecting the heated viscous material by centrifugal force from the peripheral wall of a rapidly rotating body having a plurality of superposed rows of orifices therein through which the viscous material issues in filamentary form, and directing flames of lower velocity than that of the centrifugally projected fibers and ranging up to forty meters per second in a tangential direction coincident with the direction of rotary movement of the body and into contact with the external peripheral wall and in enveloping relation with the fibers issuing from the superposed rows of orifices to heat uniformly the fibers as they issue from the orifices and to enhance the attenuation of the fibers in consequence of their envelopment by the flames, and deflecting the flames and the fibers entrained therein by blowing a ring-like blast of gases thereagainst.

3. The method of manufacturing fine fibers from heated viscous thermoplastic material, which comprises projecting the heated viscous material by centrifugal force from the peripheral wall of a rapidly rotating body having a plurality of superposed rows of orifices therein through which the viscous material issues in filamentary form, and directing flames of lower velocity than that of the centrifugally projected fibers and ranging up to forty meters per second in a tangential direction coincident with the direction of rotary movement of the body and into contact with the external peripheral wall and in enveloping relation with the fibers issuing from the superposed rows of orifices to heat uniformly the fibers as they issue from the orifices and to enhance the attenuation of the fibers in consequence of their envelopment by the flames, and deflecting downwardly the flames and the fibers entrained therein by blowing a ring-like blast of compressed gas spaced radially beyond the peripheral wall of the rotating body and the flames playing thereon.

4. The method of manufacturing fine fibers from heated viscous thermoplastic material, which comprises projecting the heated viscous material by centrifugal force from the peripheral wall of a rapidly rotating body having a plurality of superposed rows of orifices therein through which the viscous material issues in filamentary form, and directing flames of lower velocity than that of the centrifugally projected fibers and ranging up to forty meters per second in a tangential direction coincident with the direction of rotary movement of the body and into contact with the external peripheral wall and in enveloping relation with the fibers issuing from the superposed rows of orifices to heat uniformly the fibers as they issue from the orifices and to enhance the attenuation of the fibers in consequence of their envelopment by the flames, and deflecting outwardly the flames and the fibers entrained therein by interposing a physical baffle to the travel of the flames following their contact with the external peripheral wall of the rotating body.

5. The method of manufacturing fine fibers from heated viscous thermoplastic material, which comprises projecting the heated viscous material by centrifugal force from the peripheral wall of a rapidly rotating body having a plurality of superposed rows of orifices therein through which the viscous material issues in filamentary form, and directing flames of lower velocity than that of the centrifugally projected fibers and ranging up to forty meters per second into contact with the external peripheral wall and in enveloping relation with the fibers issuing from the superposed rows of orifices to heat uniformly the fibers as they issue from the orifices and to enhance the attenuation of the fibers in consequence of their envelopment by the flames, and directing said flames tangentially to the peripheral wall in the direction of rotation of the rotating body and at a flame velocity at the wall substantially the same as the peripheral velocity of the peripheral wall.

6. The method of manufacturing fine fibers from heated viscous thermoplastic material, which comprises projecting the heated viscous material by centrifugal force from the peripheral wall of a rapidly rotating centrifuge body having a plurality of superposed rows of orifices therein through which the viscous material issues in filamentary form, and directing flames of lower velocity than that of the centrifugally projected fibers and ranging up to forty meters per second into contact with the external peripheral wall and in enveloping relation with the fibers issuing from the superposed rows of orifices to heat uniformly the fibers as they issue from the orifices and to enhance the attenuation of the fibers in consequence of their envelopment by the flames, the hottest portions of said flames being concentrated in close proximity to the external peripheral wall of the rotating body, and deflecting from the peripheral wall the enveloping flames together with the fibers entrained therein.

7. The method of maunfacturing fine fibers from heated viscous thermoplastic material, which comprises projecting the heated viscous material by centrifugal force from the peripheral wall of a rapidly rotating centrifuge body having a plurality of superposed rows of orifices therein through which the viscous material issues in filamentary form, and directing flames of lower velocity than that of the centrifugally projected fibers and ranging up to forty meters per second into contact with the external peripheral wall and in enveloping relation with the fibers issuing from the superposed rows of orifices to heat uniformly the fibers as they issue from the orifices and to enhance the attenuation of the fibers in consequence of their envelopment by the flames, the hottest portions of said flames being concentrated in close proximity to the external peripheral wall of the rotating body, and deflecting from the peripheral wall the enveloping flames together with the fibers entrained therein by blowing a ring-like blast of compressed air downwardly and radially beyond the peripheral wall of the rotating body and the flames playing thereon.

8. The method of manufacturing fine fibers from heated viscous thermoplastic material, which comprises projecting the heated viscous material by centrifugal force from the peripheral wall of a rapidly rotating centrifuge body having a plurality of superposed rows of orifices therein through which the viscous material issues in filamentary form, and directing flames of lower velocity than that of the centrifugally projected fibers and ranging up to forty meters per second into contact with the external peripheral wall and in enveloping relation with the fibers issuing from the superposed rows of orifices to heat uniformly the fibers as they issue from the orifices and to enhance the attenuation of the fibers in consequence of their envelopment by the flames, the hottest portions of said flames being concentrated in close proximity to the external peripheral wall of the rotating body, and deflecting from the peripheral wall the enveloping flames together with the fibers entrained therein by interposing a physical baffle in the path of the flames following their contact with the external peripheral wall of the rotating body.

9. In apparatus for the manufacture of fine fibers from molten viscous material, the combination of a centrifuge body having a peripheral wall of substantial height provided with a plurality of rows of radially directed orifices for the discharge of molten viscous material from an interior part of said body without intersection of the filaments discharged from said orifices upon the rotation of said body at sufficient speed, means to rotate said centrifuge body, heating means annularly disposed a substantial distance above and laterally beyond the peripheral wall of said body adapted to direct low velocity flames into contact with said peripheral wall throughout its height and onto said orifices, said heating means comprising an annularly-shaped burner provided with burner orifices extending between the interior and exterior of the burner and directed downwardly towards and tangentially of said peripheral wall to direct the flames emanating from said burner orifices substantially tangentially to said peripheral wall and in the direction of rotation of said body and means cooperating with said peripheral wall and flames for deflecting said flames in such directions as to envelop said filaments within said flames during their propagation by the action of centrifugal force and their subsequent attenuation by the action of said force and said flames.

10. In apparatus for the manufacture of fine fibers from viscous material, in particular glass fibers, the combination of a centrifuge body having a frusto-conical peripheral wall of substantial height provided with a plurality of rows of radially directed orifices for the discharge of viscous material from an interior part of said body without intersection of the filaments discharged from said orifices upon the rotation of said body at sufficient speed, means to rotate said centrifuge body, and heating means annularly disposed a substantial distance above and laterally beyond the peripheral wall of said body, said heating means comprising in a plurality of burners surrounding said centrifuge body for directing flames into contact with said peripheral wall throughout its height and onto said orifices, and to accompany and entrain the filaments discharged upon rotation of the centrifuge body with no disruptive effects on said filaments, said frusto-conical peripheral wall deflecting the high temperature flames with the filaments projected from the body entrained therein in a direction away from said centrifuge body.

11. In apparatus for the manufacture of fine fibers from viscous material, the combination of a centrifuge body having a peripheral wall of substantial height provided with a plurality of rows of radially directed orifices for the discharge of viscous material from an interior part of said body upon the rotation of said body at sufficient speed, means to rotate said centrifuge body, an annular burner arranged in spaced relation above the centrifuge body and provided with at least one orifice pointing downwardly towards said peripheral wall and tangentially thereto with a component in a plane perpendicular to the axis of rotation of the centrifuge body and in the direction of said rotation, to project low velocity flames or hot gases acting in a downward direction at an angle to the peripheral wall of said body so that the flame issuing from said orifice sweeps said peripheral wall tangentially and in the direction of rotation thereof, and outer annular blowing means discharging gases downwardly, surrounding said annular burner.

12. The apparatus as set fotrh in claim 11 wherein the last-mentioned outer annular blowing means is provided with outlet orifices at substantially the same level as the orifice for the flames.

References Cited by the Examiner
UNITED STATES PATENTS

| | | | |
|---|---|---|---|
| 2,431,205 | 11/47 | Slayter | 65—15 |
| 2,609,566 | 9/52 | Slayter et al. | 65—14 X |
| 2,624,912 | 1/53 | Heymes et al. | 65—6 |
| 2,793,395 | 5/57 | Richardson | 65—14 |
| 2,931,422 | 4/60 | Long | 65—8 X |

DONALL H. SYLVESTER, *Primary Examiner.*